US010302425B2

(12) United States Patent
Lichtenberg

(10) Patent No.: US 10,302,425 B2
(45) Date of Patent: May 28, 2019

(54) MEASUREMENT SYSTEM AND METHOD FOR MEASURING AN ANGLE

(71) Applicant: Nivora IP B.V., Lochem (NL)

(72) Inventor: Marcus Hermanus Lichtenberg, Zutphen (NL)

(73) Assignee: Nivora IP B.V., Lochem (NL)

(*) Notice: Subject to any disclaimer, the term of this patent is extended or adjusted under 35 U.S.C. 154(b) by 82 days.

(21) Appl. No.: 14/433,817

(22) PCT Filed: Sep. 19, 2013

(86) PCT No.: PCT/EP2013/069491
§ 371 (c)(1),
(2) Date: Apr. 6, 2015

(87) PCT Pub. No.: WO2014/056699
PCT Pub. Date: Apr. 17, 2014

(65) Prior Publication Data
US 2015/0241208 A1 Aug. 27, 2015

(30) Foreign Application Priority Data

Oct. 12, 2012 (EP) .................................. 12188434

(51) Int. Cl.
G01B 11/26 (2006.01)
B21D 5/02 (2006.01)
(Continued)

(52) U.S. Cl.
CPC .............. G01B 11/26 (2013.01); B21D 5/006 (2013.01); B21D 5/0209 (2013.01); B65H 45/12 (2013.01); G01B 11/002 (2013.01); G01C 9/00 (2013.01)

(58) Field of Classification Search
CPC .......... B21D 5/02; B21D 5/006; B21D 5/004; B21D 5/0209; B65H 45/12;
(Continued)

(56) References Cited
U.S. PATENT DOCUMENTS 5,196,900 A 3/1993 Pettersen
6,480,269 B2 * 11/2002 Brinkman ................ B21D 5/02
356/138
(Continued)

FOREIGN PATENT DOCUMENTS

DE 202010006391 U1 11/2010
EP 1102032 A1 5/2001
(Continued)

OTHER PUBLICATIONS

EP1961502A2 is attached.*
Machine translation of EP1961502A2 is attached.*
Interview agenda 10_10_2017.pdf.*

Primary Examiner — A. Dexter Tugbang
Assistant Examiner — Joshua D Anderson
(74) Attorney, Agent, or Firm — The Webb Law Firm

(57) ABSTRACT

The invention relates to a measurement system for measuring at least an angle of the first plane through a first surface area of an object. The system includes a sensor arrangement for measuring the coordinates in a measurement coordinate system of a plurality of measurement spots on the first surface area. The measurement system further includes an inclinometer for measuring an inclination of the measurement coordinate system to the direction opposite to the direction of the force of gravity. The measurement system also includes a processing device for determining the angle of the first plane based on the measured coordinates of the plurality of measurement spots, the measured inclination from the inclinometer and the direction opposite to the force (Continued)

of gravity. The system may also measure the angle of the second plane.

5 Claims, 4 Drawing Sheets

(51) Int. Cl.
  *B65H 45/12* (2006.01)
  *G01B 11/00* (2006.01)
  *G01C 9/00* (2006.01)
  *B21D 5/00* (2006.01)

(58) Field of Classification Search
  CPC .... G01L 311/024; G01L 311/00; G01L 35/24; G01B 11/16; G01B 5/24; G01B 11/26; G01B 11/024; G01B 11/00; G01B 11/002; G01C 11/02; G01C 1/00; G01C 9/00

See application file for complete search history.

(56) References Cited

U.S. PATENT DOCUMENTS

| | | | |
|---|---|---|---|
| 6,727,986 B1 * | 4/2004 | Serruys | B21D 5/02 |
| | | | 356/139.03 |
| 6,871,413 B1 * | 3/2005 | Arms | A61B 5/1071 |
| | | | 33/1 N |
| 8,519,852 B2 * | 8/2013 | Johnson | A61G 7/018 |
| | | | 340/539.12 |
| 9,289,810 B2 * | 3/2016 | Nardetto | B21D 5/006 |
| 2006/0201006 A1 * | 9/2006 | Burlingham | G01C 15/002 |
| | | | 33/284 |

FOREIGN PATENT DOCUMENTS

| | | | | |
|---|---|---|---|---|
| EP | 1961502 A2 * | 8/2008 | | B21D 5/02 |
| NL | 1002314 C2 | 8/1997 | | |

* cited by examiner

MEASUREMENT SYSTEM AND METHOD FOR MEASURING AN ANGLE

CROSS-REFERENCE TO RELATED APPLICATIONS

This application is the United States national phase of International Application No. PCT/EP2013/069491 filed Sep. 19, 2013, and claims priority to European Patent Application No. 12188434.0 filed Oct. 12, 2012, the disclosures of which are hereby incorporated in their entirety by reference.

BACKGROUND OF THE INVENTION

Field of the Invention

The invention relates to a measurement system for measuring an angle between a first plane through a first surface area and a second plane through a second surface area of an object, to a folding machine for folding an object, to a method for measuring an angle between a first plane through a first surface area, and a second plane through a second surface area of an object and to a method for folding a sheet.

Description of Related Art

EP1102032A1 describes a method for measuring a folding angle of a sheet in a folding machine. A rotationally supported scanner is used to measure the distance to the underside of a sheet in several rotational positions of the scanner. The scanner is also used to measure the distance to an element of the folding machine in several rotational positions of the scanner. The measurements are performed in a plane which is perpendicular to the longitudinal direction of the sheet and the element.

Processing means determine a distance profile comprising the co-ordinate points for all the measured distances (to the sheet and to the element of the folding machine). Two lines are fitted through the distance profile. The angle between the two lines is taken for the angle between the sheet and the element. The folding angle is determined as 360 degrees minus two times the angle between the sheet and the element. According to EP1102032A1 it is advantageous to avoid having to measure the angle of the scanner with respect to the table on which the scanner and the element are mounted.

However, using a scanner to measure the distance to both the underside of a sheet in several rotational positions of the scanner and the element of the folding machine in several rotational positions of the scanner requires that both the underside and the element can be measured with the scanner. However, scanning the element requires time of the scanner which cannot be used to scan the underside of the sheet and therefore reduces the throughput of the folding machine.

SUMMARY OF THE INVENTION

The object of the invention is to provide a measurement system and a method to avoid this problem.

The object is reached by a measurement system for measuring an angle between a first plane through a first surface area and a second plane through a second surface area of an object, comprising a sensor arrangement for measuring the coordinates in a measurement coordinate system of a plurality of measurement spots in the first surface area, the plurality of measurement spots comprising a first measurement spot at a first distance from an intersection between the first plane and the second plane and a second measurement spot at a second distance from the intersection, the second distance differing from the first distance; characterised by an inclinometer for measuring an inclination of the measurement coordinate system to the direction opposite to the direction of the force of gravity;

a processing device for determining the angle between the first plane and the second plane based on the measured coordinates of the plurality of measurement spots, the measured inclination and information on the angle between the second plane and the direction opposite to the force of gravity.

The measurement system according to the invention is used to measure the angle between a first plane through a first surface area and a second plane through a second surface area on an object as a measure of the angle between the first surface area and the second surface area. In the measurement system according to the invention the inclination provides information to link the measured coordinates in the measurement coordinate system to the direction opposite to the force of gravity. As the second plane is not necessarily at the same angle to the direction opposite to the force of gravity, information on the angle between the second plane and the direction opposite to the force of gravity is used to determine the angle between the first plane and the second plane.

The determination of the folding angle of a sheet is an example of the determination of the measurement of the angle between two planes running along the surfaces of the folded sheet. As the inclinometer provides information on the relation between the measurement coordinate system and the direction opposite to the direction of the force of gravity, which is now taken as a reference, the sensor arrangement does not perform measurements on the element and, therefore, the angle can be determined faster.

In a further embodiment of the measurement system according to the invention, the direction opposite to the force of gravity forms an axis of a reference coordinate system (X"Y"Z") used by the inclinometer; and the processing device is arranged for determining the coordinates of the plurality of measurement spots in the reference coordinate system based on the measured inclination;

for estimating a specification of a line in the first plane based on the coordinates of the plurality of measurement spots in the reference coordinate system;

for projecting the line onto a plane perpendicular to the intersection in an object coordinate system, the object coordinate system comprising a Z-axis opposite to the direction of the force of gravity;

for determining an angle between the Z-axis and the projection of the line; and for determining the angle between the first plane and the second plane of the object based on the determined angle and information on the angle between the second plane and the direction opposite to the direction of the force of gravity.

According to the further embodiment the measured inclination provides information to be used by the processing means to perform a transformation of coordinate systems to determine the coordinates of the measurement spots in the reference coordinate system. After estimating a specification of the line in the reference coordinate system, the line is projected onto a plane perpendicular to the intersection.

Because the first and second measurement spot have a different distance to the intersection, the coordinates of the first and second measurement spot are sufficient to estimate a specification of a line in the first plane, the line not being parallel to the intersection. As the line is not parallel to the intersection, the angle between the Z-axis and the projection of the line can be determined, and can be determined in a simple way because the Z-axis is part of the object coordinate system. Finally the processing means is used to determine the angle between the first surface area and the second surface area based on the determined angle and information on the angle between the second plane and the direction opposite to the direction of the force of gravity.

The further embodiment provides the advantage of a faster processing device, as coordinate transformations, estimating line specifications and projections can be performed faster.

In a further embodiment of the measurement system according to the invention, the sensor arrangement comprising a rotationally mounted scanner arranged to measure a coordinate of a first measurement spot of the plurality of measurement spots by sending measurement radiation in a first measurement direction and to measure a second coordinate of a second measurement spot by sending measurement radiation in a second measurement direction.

As the scanner is rotationally mounted, it can send measurement radiation in different directions. By sending the measurement radiation in different directions, the coordinates of a plurality of measurement spots in the first surface area can be measured.

Rotating can be performed fast and accurately, which contributes to a fast determination of the angle between the first plane and the second plane.

In another embodiment, the measurement system according to the invention comprises
 a further sensor arrangement for measuring the coordinates in a further measurement coordinate system of a further plurality of measurement spots in the second surface area, the further plurality of measurement spots comprising a third measurement spot at a third distance from the intersection and a fourth measurement spot at a fourth distance from the intersection, the fourth distance differing from the third distance;
 a further inclinometer for measuring a further inclination of the further measurement coordinate system to the direction opposite to the direction of the force of gravity;
 the processing means being further arranged to determine the angle between the first plane and the second plane based on the measured coordinates of the further measurement spots and the measured further inclination.

According to this embodiment, the measurement system is arranged to measure the angle between the second plane and the direction opposite to the direction of the force of gravity similar to the arrangement to measure the angle between the first plane and the direction opposite to the direction of the force of gravity, which information is used to determine the angle between the first plane and the second plane. According to the embodiment, the direction opposite to the direction of the force of gravity is taken as a reference and the angle between the second plane.

In a further embodiment of the measurement system according to the invention, the direction opposite to the force of gravity forms an axis of a further reference coordinate system used by the further inclinometer. Also the processing means is further arranged for determining the coordinates of the further plurality of measurement spots in the further reference coordinate system based on the measured further inclination;
 for estimating a specification of a further line in the second plane based on the coordinates of the further plurality of measurement spots in the further reference coordinate system;
 for projecting the further line onto a plane perpendicular to the intersection in the object coordinate system;
 for determining a further angle between the projection of the further line and the Z-axis;
 for determining the angle between the first plane and the second plane of the object based on the determined angle and the determined further angle.

According to the further embodiment the further inclination forms information to be used by the processing means to perform a transformation of coordinate systems to determine the coordinates of the further measurement spots in the further reference coordinate system. After estimating a specification of the further line in the further reference coordinate system, the further line is projected onto a plane perpendicular to the intersection. Because the third and fourth measurement spot have a different distance to the intersection, the coordinates of the third and fourth measurement spot are sufficient to estimate a specification of a further line in the second plane, the further line not being parallel to the intersection. As the further line is not parallel to the intersection, the angle between the Z-axis and the projection of the line can be determined, and can be determined in a simple way because the Z-axis is part of the object coordinate system. Finally the processing means is used to determine the angle between the first surface area and the second surface area based on the determined angle and information on the angle between the second plane and the direction opposite to the direction of the force of gravity.

The further embodiment provides the advantage of simple requirements to the processing device and being fast, as coordinate transformations, estimating line specifications and projections can be performed fast.

In yet a further embodiment, a folding machine for folding an object comprises a measurement arrangement according to the invention. Because the folding machine comprises a measurement arrangement according to the invention, the object can be measured without having to remove the object.

In a further embodiment the folding machine comprises an orientation sensor for measuring a first orientation of the measurement coordinate system with respect to compass directions; the processing means being further arranged to use the measured first orientation and a stored value for a second orientation of a longitudinal direction of the folding machine with respect to compass directions to determine the coordinates of the plurality of measurement spots in the object coordinate system.

By measuring the first orientation with respect to compass directions and a stored value for a second orientation of the longitudinal direction of the folding machine, information on the direction of axis in the coordinate systems is be gathered. The processing means uses this information for determining the coordinates of the measurement spots in the object coordinate system. Therefore the folding machine requires less calibration or less precise manufacturing to secure the alignment of the object coordinate system with the measurement coordinate system.

In a further embodiment the folding machine comprises a first orientation sensor for measuring a first orientation of the measurement coordinate system with respect to compass directions and a second orientation sensor for measuring the orientation of the object coordinate system with respect to compass directions, the processing means being further arrange to use the measured first orientation and the measured second orientation sensor to determine the coordinates of the plurality of measurement spots in the object coordinate system.

By measuring the first orientation and second orientation with respect to compass directions information of the relative orientations between the measurement coordinate system and the object coordinate system is obtained. This information is used by the processing means. This can be advantageously used to position the measurement system at an unknown location and orientation with respect to the folding machine.

In an embodiment according to the invention, a method is provided for measuring an angle between a first plane through a first surface area and a second plane through a second surface area of an object, the method comprising
using a sensor arrangement to measure coordinates in a measurement coordinate system of a plurality of measurement spots in the first surface area, the plurality of measurement spots comprising a first measurement spot at a first distance from an intersection between the first plane and the second plane and a second measurement spot at a second distance from the intersection, the second distance differing form the first distance;
measuring an inclination of the measurement coordinate system to the direction opposite to the force of gravity; and
determining the angle between the first plane and the second plane based on the measured coordinates of the plurality of measurement spots, the measured inclination and information on the angle between the second plane and the direction opposite to the force of gravity.

According to the method the angle between a first plane through a first surface area and a second plane through a second surface area on an object is determined as a measure of the angle between the first surface area and the second surface area. In the method according to the invention the inclination provides information to link the measured coordinates in the measurement coordinate system to the direction opposite to the force of gravity. As the second plane is not necessarily at the same angle to the direction opposite to the force of gravity, information on the angle between the second plane and the direction opposite to the force of gravity is used to determine the angle between the first plane and the second plane.

The determination of the folding angle of a sheet is an example of the determination of the measurement of the angle between two planes running along the surfaces of the folded sheet. As the inclinometer provides information on the relation between the measurement coordinate system and the reference coordinate system, the sensor arrangement does not perform measurements on the element and therefore the angle can be determined faster.

In a further embodiment of the method, determining the angle between the first plane and the second plane based on the measured coordinates of the plurality of measurement spots, the measured inclination and information on the angle between the second plane and the direction of the force of gravity comprises
using the measured inclination to determine the coordinates of the plurality of measurement spots in a reference coordinate system of which the direction opposite to the force of gravity forms an axis;
estimating a specification of a line in the first plane based on the coordinates of the plurality of measurement spots in the reference coordinate system;
projecting the line onto a plane perpendicular to the intersection in an object coordinate system, the object coordinate system comprising a Z-axis parallel to the direction of the force of gravity;
determining an angle between the Z-axis and the projection of the line; and
determining the angle between the first plane and the second plane based on the determined angle and information on the angle between the second plane and the direction of the force of gravity.

According to the further embodiment the inclination forms information to be used to perform a transformation of coordinate systems to determine the coordinates of the measurement spots in the reference coordinate system. After estimating a specification of the line in the reference coordinate system, the line is projected onto a plane perpendicular to the intersection. Because the first and second measurement spot have a different distance to the intersection, the coordinates of the first and second measurement spot are sufficient to estimate a specification of a line in the first plane, the line not being parallel to the intersection. As the line is not parallel to the intersection, the angle between the Z-axis and the projection of the line can be determined, and can be determined in a simple way because the Z-axis is part of the object coordinate system. Finally the angle between the first surface area and the second surface area is determined based on the determined angle and information on the angle between the second plane and the direction opposite to the direction of the force of gravity.

The further embodiment of the method provides the advantage of simple requirements to equipment for executing the method and being fast, as coordinate transformations, estimating line specifications and projections can be performed faster.

In a further embodiment of the invention, the method comprises
measuring a first orientation of the measurement coordinate system with respect to compass directions;
determining the coordinates of the plurality of measurement spots in the reference coordinate system based on the measured first orientation and a stored value for a second orientation of the intersection with respect to compass directions.

By measuring the first orientation with respect to compass directions and a stored value for a second orientation on the intersection, information on the direction of axis in the coordinate systems are gathered. The processing means uses this information for determining the coordinates of the measurement spots in the object coordinate system. Therefore this method can be applied with low restrictions on calibration and less precise manufacturing to secure the alignment of the object coordinate system with the measurement coordinate system.

In a further method according to the invention, the method comprises
measuring the coordinates of the first measurement spot by emitting measurement radiation in a first measurement direction;
using control means to rotate a scanner around an axis of the measurement coordinate system;
measuring the coordinates of the second measurement spot by emitting measurement radiation in a second measurement direction; and using information on the difference between the first measurement direction and the second measurement direction for determining the second inclination.

By rotating the scanner around, the measurement direction changes so that the coordinates of several measurement spots in the plurality of measurement spots can be measured. Rotating can be performed fast and accurate.

In a further embodiment of the method according to the invention, the method comprises measuring the coordinates in a further measurement coordinate system of a further plurality of measurement spots in the second surface area, the further plurality of measurement spots comprising a third measurement spot at a third distance from the intersection and a fourth measurement spot at a fourth distance from the intersection, the fourth distance differing from the third distance;

measuring a further inclination of the further measurement coordinate system to the direction opposite to the direction of the force of gravity;

determining the angle between the first plane and the second plane based on the measured coordinates of the further measurement spots and the measured further inclination.

According to this embodiment, the measurement system is arranged to measure the angle between the second plane and the direction opposite to the direction of the force of gravity similar to the arrangement to measure the angle between the first plane and the direction opposite to the direction of the force of gravity, which information is used to determine the angle between the first plane and the second plane. According to the embodiment, the direction opposite to the direction of the force of gravity is taken as a reference and the angle between the second plane. Therefore there is no need to measure the positions of an element of a folding machine to determine this angle.

In a further embodiment of the invention, the step of determining the angle between the first plane and the second plane based on the measured coordinates of the further measurement spots and the measured further inclination comprises determining the coordinates of the further plurality of measurement spots in the further reference coordinate system based on the measured further inclination;

estimating a specification of a further line in the second plane based on the coordinates of the further plurality of measurement spots;

projecting the further line onto a plane perpendicular to the intersection in the object coordinate system;

determining a further angle between the projection of the further line and the Z-axis; and determining the angle between the first plane and the second plane based on the determined angle and the determined further angle.

According to the further embodiment the further inclination forms information to be used to perform a transformation of coordinate systems to determine the coordinates of the further measurement spots in the further reference coordinate system. After estimating a specification of the further line in the further reference coordinate system, the further line is projected onto a plane perpendicular to the intersection. Because the third and fourth measurement spot have a different distance to the intersection, the coordinates of the third and fourth measurement spot are sufficient to estimate a specification of a further line in the second plane, the further line not being parallel to the intersection. As the further line is not parallel to the intersection, the angle between the Z-axis and the projection of the line can be determined, and can be determined in a simple way because the Z-axis is part of the object coordinate system. Finally, the angle between the first surface area and the second surface area is determined based on the determined angle and information on the angle between the second plane and the direction opposite to the direction of the force of gravity.

The further embodiment provides the advantage of simple requirements to the processing device and being fast, as coordinate transformations, estimating line specifications and projections can be performed fast.

In yet a further embodiment of the invention, the method comprises folding a sheet in a folding machine, determining the angle between the first plane and the second plane, and changing the angle between the first plane and the second plane by performing a further folding operation on the object in the folding machine.

The determined angle provides feedback on the angle between the first plane and the second plane of the folded sheet. The angle is optimized based on this feedback in the further folding operation.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE INVENTION

Figure 1:
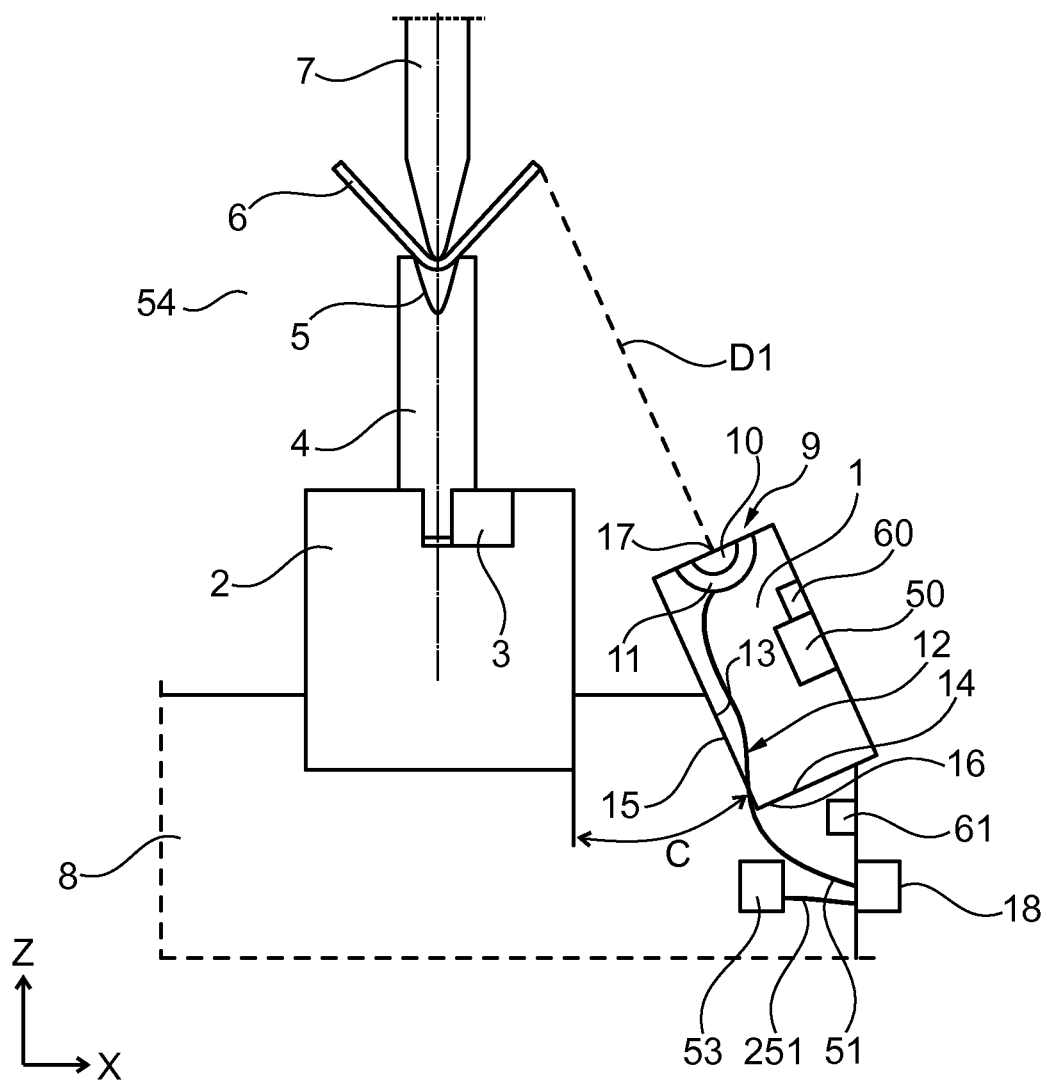
FIG. 1 depicts a side view of a sensor arrangement according to the invention and a sheet supported on a folding machine

In an embodiment of the invention, which is depicted in FIG. 1, a folding machine (54) comprises a measurement system (1). The folding machine (54) comprises a table (2) which comprises a key system (3) for fastening an element (4). The element (4) comprises a support die having a recess (5) for supporting a sheet (6). The folding machine (54) further comprises a second element (7) comprising a moveable punch for folding the sheet (6) in a known manner between the element (4) and the second element (7). The longitudinal direction (YY) (not shown) of the element (4), the second element (7) and the recess (5) is in a direction perpendicular to the plane of the drawing.

The folding machine (54) further comprises a framework (8) for supporting the table (2). This framework (8) also supports the drive system (not shown) for the second element (7). The drive system comprises a known adjustable hydraulic pressure device in order to fold the sheet (6) to a desired folding angle.

In use, a sheet (6) is placed onto the element (4) and the second element (7) is driven towards the sheet (6) by the drive system (not shown). Accordingly the sheet (6) is driven into the recess by the second element (7), but as the sheet (6) is supported by the element (4), it bends along the longitudinal direction (XX). In the embodiment, the recess (5) and the second element (7) are symmetrical. The drive system is arranged to drive the second element along a drive direction parallel to the direction of the Z-axis of a Cartesian object coordinate system $(X_f Y_f Z_f)$, whereby a movement of the second element (7) in the direction of the element (4) corresponds to a negative sign. The folding machine is leveled upon installation so that the drive direction and $Z_f$-direction are parallel to the direction of the force of gravity. The $Y_f$-axis of the object coordinate system (XYZ) is parallel to the direction (YY) of the recess (5). In this embodiment the recess (5) is symmetrical around a plane of symmetry (indicated by a dash dotted line), which comprises the $Y_f$-axis (or the longitudinal direction of the recess (5)) and the $Z_f$-axis. The $X_f$-coordinate of the object coordinate system $(X_f Y_f Z_f)$ is chosen to be perpendicular to the plane of symmetry of the recess (5). The second element (7) is arranged to be symmetrical around the plane of symmetry. With this arrangement, the fold in the sheet (6) is expected to be symmetrical around this plane of symmetry as well. Arranging the drive direction to be parallel to the direction of the force of gravity and the use of symmetry is advantageous to prevent the folding machine (54) to tilt or drift with respect to its surroundings while in use under influence of the large weight of the folding machine (54) and the large forces used to fold for instance thick metal sheets (6). For the purpose of understanding the invention, also an object coordinate system (XYZ) is introduced, which in this embodiment is equal to the object coordinate system $(X_f Y_f Z_f)$ apart from the position of the origin. Thus, the direction of the X-axis is equal to the direction of the $X_f$-axis, the direction of the Y-axis is equal to the direction of the $Y_f$-axis and the direction of the Z-axis is equal to the direction of the $Z_f$-axis.

The folding machine (54) also comprises a measurement system (1) which is supported by the framework (8). The measurement system comprises a sensor (9), comprising a rotationally supported scanner (10). The scanner (10) can measure and determine a distance between the scanner (10) and the sheet (6) by sending radiation to the object in a measurement direction and receiving reflected radiation. For this purpose the scanner (10) comprises a source of radiation. In this embodiment a MEL Line Scanner M2D is used, which is a laser scanner for profile contour scanning, marketed by Microelektronik GmbH, Eching/Germany. Alternative embodiments are based on other scanners which are for instance based on the sonar principle or, the principle of laser triangulation.

The sensor (9) further comprises a control means (11) for controlling the rotational position of the scanner (10) and thereby the measurement direction. While keeping the relative locations and orientations of the sheet (6) and the measurement system (1) fixed, by changing the measurement direction, the distance to different locations on the sheet (6) can be measured.

The measurement system (1) is mounted at a mounting angle (C) with respect to the table (2) in such a way that the sensor (9) can measure the distances in a plane which has the longitudinal direction (YY) as its normal, i.e. it is perpendicular to the longitudinal direction (YY). The sensor (9) is a two-dimensional sensor, which means that the scanner (10) is arranged to be rotated around one rotation axis. For aligning the rotation axis to the longitudinal direction (YY), the measurement system (1) further comprises a mounting part (12) for mounting the measurement system (1) to the framework (8). In an embodiment the mounting part (12) comprises two references surfaces (13,14). They are supported on two corresponding reference surfaces (15,16) on the framework (8). The corresponding reference surfaces (15,16) intersect along a line that is parallel to the longitudinal direction (YY). As the corresponding surfaces (15,16) support the reference surfaces (13,14), the reference surfaces (13,14) also intersect along a line that is parallel to the longitudinal direction (YY).

Figure 2:
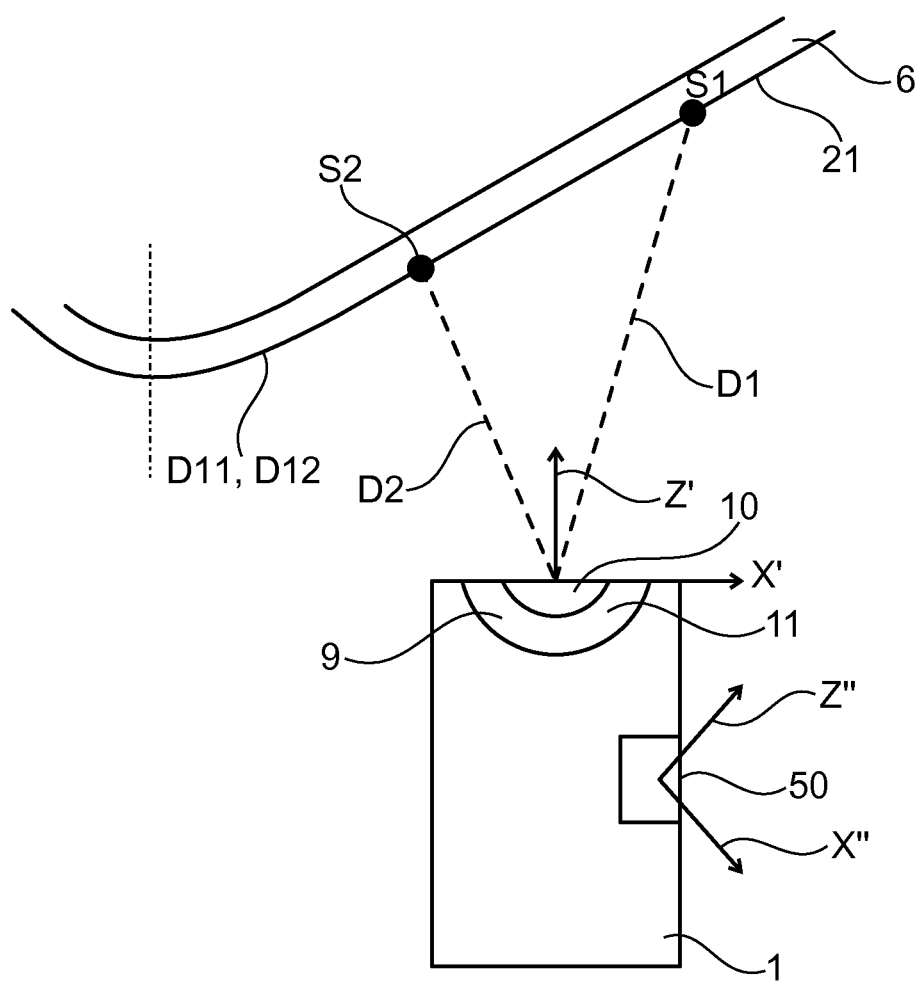
FIG. 2 shows the positions of a plurality of measurement spots in a first surface area on the sheet

The sensor (9) is arranged to measure the value of a plurality of distances (D1, D2) between the sensor (9) and a plurality of measurement spots (S1,S2) on the side of the sheet (6) which faces the sensor (9). This is shown in FIG. 2. The different locations are in different measurement directions from the origin of a Cartesian measurement coordinate system (X'Y'Z') of the sensor which coincides with the source of radiation of the scanner (10). The Y'-axis of the measurement coordinate system (X'Y'Z') is parallel to the longitudinal direction (YY). As the Y-axis of the object coordinate system (XYZ) is also parallel to the longitudinal direction (YY), the Y-axis and the Y'-axis are parallel. The X'-axis of the measurement coordinate system is parallel to the surface of the scanner (10) facing the sheet (6). In the embodiment a Cartesian coordinate system is used, but other coordinate systems could be used as well. The Z'-axis of the measurement coordinate system extends from the scanner (10) in the direction of the sheet. The measurement directions correspond to measurement angles with the Z'-axis in the X'Z'-plane, as the scanner (10) is arranged to rotate around the Y'-axis only. The origin of the measurement coordinate system (X'Y'Z') is chosen such that the scanner rotates around the Y'-axis so as to facilitate easier and thus faster processing later on.

The sensor (9) is arranged to transfer the measured values of the plurality of distances (D1,D2) and the corresponding measurement angles to a processing device (18). The processing means is depicted in FIG. 1. The measured values and the corresponding measurement directions are transferred via a wired connection (51). In an alternative embodiment the measured values and the corresponding measurement directions are transferred wirelessly, for instance via a Bluetooth or Wireless LAN (WLAN) connection. The measurement directions are transferred to the processing means (18) in the measurement coordinate system (X'Y'Z') of the sensor.

The measurement system (1) further comprises an inclinometer (50) for measuring a value of the inclination of the sensor (9) with respect to the earth gravitational field, i.e. the direction of the force of gravity. The inclinometer provides measurements in a Cartesian reference coordinate system (X"Y"Z"). In this reference coordinate system (X"Y"Z"), the Z"-axis is parallel to the direction of the force of gravity. However, a movement away from the center of gravity of the earth corresponds to a positive increase of the Z"-coordinate. For simplicity reasons, it is assumed here that the Y"-axis is parallel to the longitudinal direction (XX), and therefore also parallel to the direction of the Y'-axis of the measurement coordinate system. With these orientations of the Y"-axis and the Z"-axis, the X"-axis is in the X'Z'-plane of the measurement coordinate system. This is advantageous as the transformations described below are simplest and can therefore be performed fastest. The measured value of the inclination of the sensor (9) is also transferred to the processing means (18) in the reference coordinate system (X"Y"Z").

The processing means (18) are arranged to calculate the coordinates of the locations on the sheet (6) in the measurement coordinate system (X'Y'Z') based on the values for the plurality of distances (D1, D2) and the corresponding angles to the Z'-axis in the X'Z'-plane. It is to be noted that the X'Z'-plane coincides with the XZ-plane because the Y-axis and the Y'-axis are parallel and because both coordinate systems are Cartesian. However, the coordinates of the plurality of measurement spots (S1,S2) differ in the XYZ-coordinate system and the X'Y'Z'-coordinate systems.

The processing means (18) are then used to perform a coordinate transformation to express the coordinates of the plurality of measurement spots on the sheet (6) in the reference coordinate system (X"Y"Z"). This is done based on the information that the Y'-axis and Y"-axis are parallel to each other and the measured inclination of the sensor (9).

The processing means (18) is arranged to fit a straight line (21) through the calculated coordinates in the reference coordinate system (X"Y"Z"). This is advantageously done by using the least squares criterion, as this is fastest and provides the best fit for the type of measurement errors which are expected, i.e. normally distributed measurement errors. The fit corresponds to the following formula:

$$X''=C1+\alpha Z''$$

wherein C1 represents an offset the value of which is not relevant. As the fold is parallel to the Y-axis of the object coordinate system, the next step is to project the fit onto the XZ-plane, i.e. onto the plane perpendicular to the Y-axis. This means that the projection will be parallel to the Y-axis. Now because of the combination of facts that Z-axis and Z"-axis are parallel, the Y-axis and the Y"-axis are parallel, the object coordinate system (XYZ) is Cartesian and the reference coordinate system (X"Y"Z") is Cartesian, the X-axis and the X"-axis are parallel. However the origins of the object coordinate system (XYZ) and the reference coordinate system (X"Y"Z") do not coincide. Therefore, when projecting the fitted line onto XZ-plane, i.e. when projecting the fitted line parallel to the Y-axis, the line can be represented as $$X=C2+\alpha Z$$

wherein C2 represents an offset the value of which is not relevant. The slope ($\alpha$) of the line corresponds to the tangents of the angle between the drive direction of the folding machine (54) and the sheet (6). This angle can therefore be calculated by calculating the arctangent of the slope of the line (a).

As the fold is expected to be symmetrical around the plane of symmetry and as this plane of symmetry comprises the drive direction and thus the Z-axis, the folding angle is now computed by the processing means (18), by multiplying the angle between the direction of the force of gravity and the sheet (6) by two.

The computed folding angle is transferred to a control system (53) via a second wired connection (251) of the folding machine (54). The control system compares the computed folding angle with a desired folding angle and controls the drive system to adjust the distance between the element (4) and the second element (7) to increase the folding area. By continuously feeding computed folding angles to the control system (53) the desired folding angle of the sheet (6) can be accurately obtained. When the difference between the computed folding angle and the desired folding angle is below a threshold value, the control system (53) controls the drive system to increase the distance between the element (4) and the second element (7) so that the sheet (6) can be removed and a new sheet (6) can be placed in the folding machine (54).

In the embodiment described above, the scanner (10) is used to measure a plurality of distances (D1,D2) corresponding to a plurality of measurement spots on the sheet (6). In an alternative embodiment, plurality of distances comprises a larger number of distances. By increasing the number of measured distances, the accuracy of the fit is increased and therefore the accuracy of the computed folding angle. In a further alternative embodiment, the scanner (10) is used to measure the distance (D1) at least two times to increase accuracy of the measurements.

In a further embodiment, the processing means (18) are integrated in the control system (53) of the folding machine (54).

In a further embodiment, the scanner is not rotated around the Y'-axis of the measurement coordinate system (X'Y'Z'), but instead is moved by the control means (11) in the X'-direction while maintaining the same measurement direction. As described earlier, a plurality of distances (D1,D2) is measured. The processing means (18) are arranged to calculate the coordinates of the locations on the sheet (6) in the measurement coordinate system (X'Y'Z') based on the values for the plurality of distances (D1, D2), the corresponding angle between the measurement direction and Z'-axis in the X'Z'-plane and the corresponding coordinates of the scanner in the X'-direction. As before, the processing means (18) are further arranged to calculate the positions of the locations on the sheet (6) in the reference coordinate system (X"Y"Z") based on the coordinates of the locations on the sheet (6) in the measurement coordinate system (X'Y'Z'), the measured value of the inclination of the sensor (9) in the reference coordinate system (X"Y"Z") and information on the relative orientations of the object coordinate system and the reference coordinate system. In an alternative embodiment, the scanner (10) is moved in a combination of directions in the measurement coordinate system, or a combination of movement and rotation is applied. A limitation to helpful combinations can be understood by imagining a sheet coordinate system (RST) wherein the R-axis is parallel to the longitudinal direction of the fold. The T-axis is the normal to a first plane along a first surface of the sheet (6) where the measurement radiation is reflected. A second plane is situated on the other side of the fold and along a second surface of the sheet (6). Both the first surface and the second surface face away from the plane of symmetry of the sheet (6). The first plane and the second plane intersect along an intersection line. The S-axis represents the direction in which the distance of measurement spots to the intersection line is measured. In order to be able to calculate the angle between the first plane and the driving direction (which lies in the plane of symmetry of the sheet (6), measurements at at least two different S-coordinates (or two different distances from the intersection line) must be obtained. If only two measurements were obtained and both are from measurement spots at the same S-coordinate, the measurement spots would have the same X and Z-coordinates in the object coordinate system. Having the same X- and Z-coordinates means that no line (21) can be fitted through these points in the XZ-plane.

Figure 3:
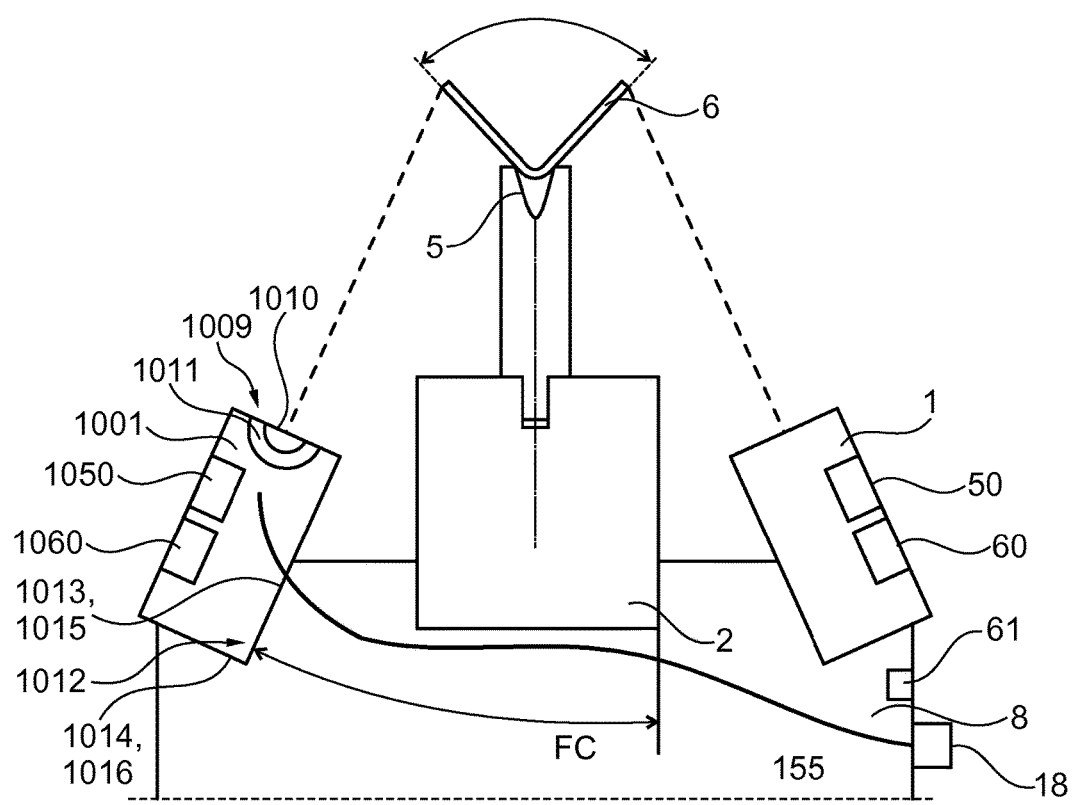
FIG. 3 shows a folding machine comprising a further sensor arrangement
Figure 4:
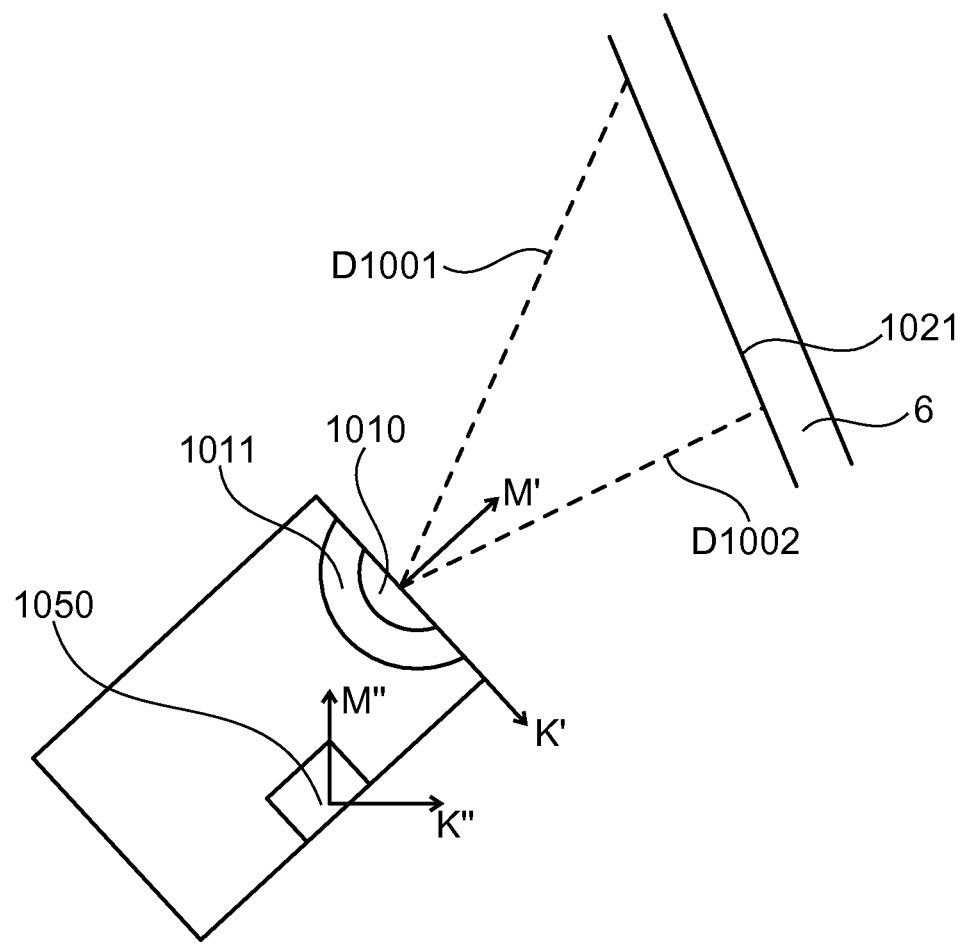
FIG. 4 shows the positions of a further plurality of measurement spots in a second surface area on the sheet

In an embodiment of the invention, the folding machine comprises a further measurement system (1001) placed on the other side of the recess (5). This is shown in FIG. 3. The further measurement system (1001) and its elements have the same function as the measurement system (1) and the corresponding elements, except for that it is arrange to measure at locations of the sheet (6) on the other side of the recess and therefore of the fold. It therefore comprises the similar elements such as a further sensor (1009), a further scanner (1010) and a further control means (1011) as well as a further wired connection (155) to the processing means (18). The further scanner (1010) is of the same type as the scanner (10) and is rotated in a manner corresponding to the rotation of scanner (10). The further measurement system (1001) is mounted at a further mounting angle (FC) with respect to the table (2) and comprises a further mounting part (1012) which comprises two further reference surfaces (1013,1014). The two further reference surfaces (1013, 1014) are supported on two further corresponding reference surfaces (1015,1016) on the framework (8). The further corresponding reference surfaces (1015,1016) intersect along a line that is parallel to the longitudinal direction, i.e. the Y-axis of the object coordinate system.

The further sensor (1009) is arranged to measure the value of a plurality of further distances (D1001,D1002) between the further sensor (1009) and further measurement spots on the side of the sheet (6) which faces the further sensor (1009). The further measurement spots are in a plurality of further measurement directions from the origin of a further measurement coordinate system (K'L'M') of the sensor. This origin of the further measurement coordinate system (K'L'M') coincides with the source of radiation of the further scanner (1010). The L'-axis of the further measurement coordinate system (K'L'M') is parallel to the longitudinal direction (XX) and therefore is parallel to the Y'-axis around which the scanner (10) is rotated. The K'-axis of the further measurement coordinate system is parallel to the surface of the further scanner (1010) facing the sheet (6). In the embodiment a Cartesian coordinate system is used, but other coordinate systems could be used as well. The M'-axis of the measurement coordinate system extends from the further scanner (1010) in the direction of the sheet (6). The further measurement directions correspond to further measurement angles with the M'-axis in the K'M'-plane, as the further scanner (1010) is arranged to rotate around the L'-axis only. The origin of the measurement coordinate system (K'L'M') is chosen such that the scanner rotates around the L'-axis so as to facility easier and thus faster processing later on.

The further sensor (1009) is arranged to transfer the measured values of the plurality of further distances (D1001, D1002) and the corresponding further measurement angles to the processing device (18) via a further wired connection (1051).

The further measurement system (1001) further comprises a further inclinometer (1050) for measuring a further value of the inclination of the further sensor (1009) with respect to the direction of the force of gravity. The further inclinometer (1050) provides measurements in a further reference coordinate system (K"L"M"). In this further reference coordinate system (K"L"M"), the M"-axis is parallel to the direction of the force of gravity. For simplicity reasons, it is assumed here that the L"-axis is parallel to the longitudinal direction (XX), and therefore also parallel to the direction of the Y'-axis and the Y"-axis. With these orientations the K"-axis is in the K'M'-plane of the further measurement coordinate system. Also, with these orientations, and as the direction of the force of gravity is equal when measured by the inclinometer (50) and the further inclinometer (1050), the further reference coordinate system (K"L"M") coincides with the reference coordinate system (X"Y"Z") apart from a different position of the corresponding origins. The further value of the inclination of the further sensor (1009) is transferred to the processing means (18) in the further reference coordinate system.

The processing means (18) is arranged to calculate the coordinates of the further measurement spots on the sheet (6) in a way similar to how it calculates the coordinates of the measurement spots. However, the processing means (18) calculates the coordinates of the further measurement spots in the further measurement coordinate system (K'L'M') based on the values of the plurality of further distances (D1001,D1002) and the corresponding further measurement angles of the corresponding further measurement directions to the M'-axis in the K'M'-plane. It is to be noted that the K'M'-plane is parallel to the XZ-plane because the Y-axis and the L'-axis are parallel and because both coordinate systems are Cartesian. However, the coordinates of a point in the K'M'-plane differ from the coordinates in the XZ-plane when projected onto the XZ-plane along the Y-axis.

The processing means (18) are then used to perform a coordinate transformation to express the further coordinates of the further measurement spots on the sheet (6) in the further reference coordinate system (K"L"M"). This is done based on the information that the L'-axis and the L"-axis are parallel to each other and the measured inclination of the sensor (9).

The processing means (18) is arranged to fit a further straight line (1021) through the calculated coordinates in the further reference coordinate system (K"L"M") based upon the formula $$K''=C3+\beta M''$$

This is done by using the least squares criterion for the same reasons as for fitting the line (21). C3 represents a further offset the value of which is not relevant. Now, because of the combination of facts that the Z-axis and M"-axis are parallel, the Y-axis and L"-axis are parallel, object coordinate system is Cartesian and that the further reference coordinate system (K"L"M") is Cartesian, the X-axis and the K"-axis are parallel. Even though the origins of the object coordinate system (XYZ) and the further reference coordinate system (K"L"M") do not coincide, the further straight line (1021) is represented in the XZ-plane as $$X=C4+\beta Z$$

The value of the offset C4 is not relevant. The further slope ($\beta$) of the further line (1021) corresponds to the tangents of the further angle between the drive direction of the folding machine (104) and the sheet (6). This further angle is calculated by the processing means (18) as the arctangent of the further slope ($\beta$) of the further line (1021).

Note that both the angle and the further angle are angles to the Z-axis in the XZ-plane. Finally, the processing means (18) calculates the folding angle by adding the angle and the further angle.

In an alternative embodiment the further scanner (1010) it is moved by the further control means (1011) instead of being rotated, or a combination of rotation and movement is applied similar to what is forced onto the scanner (10). Alternatively the further control means (1011) and the control means are of a different type, or even apply a different measurement principle (sonar, laser triangulation) and are moved or rotated in a different fashion.

In a further embodiment, the measurement system (1) comprises an orientation sensor (60) to determine the orientation of the measurement coordinate system (X'Y'Z') with respect to the earth magnetic field. The further measurement system (1001) comprises a further orientation sensor (1060) to determine the orientation with respect to the earth magnetic field. The folding machine comprises a second orientation sensor (61). The measurements of the orientation sensor (60), the further orientation sensor (106) and the second orientation sensor (61) are used by the processing means (18) to verify the alignment of the different axis of the coordinate systems and to check if the orientations drift.

Alternatively, the measurement system (1) comprises an orientation sensor (60) for measuring the orientation of the measurement coordinate system (X'Y'Z') with respect to compass directions. The folding machine (54) comprises a second orientation sensor (61) for measuring the orientation of the object coordinate system (XYZ) with respect to compass directions. For this embodiment it is not relevant if a further measurement system (1001) is present. In this embodiment, the Y'-axis of the measurement coordinate system (X'Y'Z') is not parallel to the longitudinal direction. The orientations measured by the orientation sensor (60) and the second orientation sensor (61) are used by the processing means (18) to make the suitable coordinate transformations. This is especially advantageous because the support of the measurement system (1) is less important. For instance the corresponding surfaces can intersect along any line. The measurement system (1) comprising an orientation sensor (60)) and the folding machine (54) comprising a second orientation sensor is also advantageous to gain freedom to position the measurement system (1) for instance in embodiments wherein the measurement system (1) is not fixedly attached to the folding machine (54). Furthermore, based on the measured orientation of the coordinate systems, the X'Z'plane, in which the measurements are performed does not need to be perpendicular to the longitudinal direction. Also, the coordinates of locations on the sheet (6) measured with a 3D-sensor can be calculated now and by suitable coordinate transformations be used to calculate the folding angle.

In a further embodiment the measurement system (1) comprises an attitude and heading reference system (AHRS) (70) which comprises the inclinometer (50) and the orientation sensor (60). The AHRS is also arranged to provide information on the acceleration. The measurement system (1) is moved along the frame (8), for instance over a rail, to gather measurement data at a plurality of locations along the longitudinal direction, i.e. at a plurality of Y-coordinates. The accelerations as measured by the AHRS (70) are integrated to give a displacement. The displacement is transmitted to the processing means (18). The processing means use the displacement and the measurement data at the plurality of locations along the longitudinal direction to fit a plane through the locations on the sheet (6) of which the distance is measured in this way. The processing means (18) are arranged to compute the angle between the fitted plane and Z'-axis and in an analogue fashion as described before to compute the folding angle based on the angle between the fitted plane and the Z'-axis by multiplying the angle by two.

In a further embodiment, a plurality of measurement systems (not shown) is positioned at different Y'-coordinates. The plurality of measurement systems all provide information on the distance of the sheet (6) in corresponding measurement coordinate systems and the relation between the measurement coordinate systems and the reference coordinate systems as measured by inclinometers and orientations sensors comprised in the plurality of measurement systems. The information is combined to fit a plane through the locations on the sheet (6) and to compute an angle to the direction of the force of gravity and finally the folding angle in a way similar to what has been described above but with modifications which are clear to the person skilled in the art. While specific embodiments of the invention have been described above, it will be appreciated by a person of ordinary skill in the art that the invention may be practiced otherwise than as described, but still according to the teachings above. The descriptions above are intended to be illustrative, not limiting. For example, the invention may take the form of a computer program containing one or more sequences of machine-readable instructions describing a method a disclosed above, or a data storage medium (e.g. semiconductor memory, magnetic or optical disk) having such a computer program stored therein. Also, the element (4) may be driven towards and from the second element (7) or both may be driven towards and from each other. Furthermore, the measurement system (1) comprising the inclinometer (50) and in some embodiments also the orientation sensor (60) may be supported by the element (4) or by the key system (3). Similarly, but independently the further measurement system (1001) comprising the further inclinometer (1050) may be supported by the element (4) or by the key system (3). Furthermore, the processing means can be located elsewhere, for instance on the support table or on the measurement system (1). As another example, the sensor may be tilted as well to adjust the measurement direction. As yet another example, multiple sensors may be used, wherein each only measures the distance to one measurement spot as long as the measured coordinates of the measurement spots can all be expressed in a single measurement coordinate system. Hence the relationship between the measurement coordinate systems of each sensor and the measurement directions should be known. Also in practice different wordings may be used to mean the same thing. For instance, the folding machines can also be referred to as press brakes.

The invention claimed is:

1. For an object having a first plane with a first surface area facing away from a plane of symmetry, said plane of symmetry being centrally arranged within a folding machine and is parallel to a drive direction of a first element and a second element of said folding machine, said elements being arranged about said plane of symmetry and are driven to impart a force upon the object to form an expected fold around said plane of symmetry and an adjacent second plane with a second surface area facing away from the plane of symmetry with a non-zero angle formed between the first plane and the second plane along the plane of symmetry, a measurement system is for measuring at least an angle of the first plane, comprising:
   a sensor arrangement comprising a fixed sensor, fixedly mounted to the folding machine on a framework in a relative location and orientation between the object and the measurement system by a mounting part, said fixed sensor for measuring the coordinates in a measurement coordinate system of a plurality of measurement spots on the first surface area, the plurality of measurement spots comprising a first measurement spot at a first distance from an intersection between the first plane and the second plane along the plane of symmetry and a second measurement spot at a second distance from the intersection along the plane of symmetry, the second distance differing from the first distance and wherein the fixed sensor arrangement further comprises a rotationally supported scanner rotationally mounted inside the fixed sensor to support several rotational positions of the scanner, the rotationally supported scanner being arranged to measure a coordinate of a first measurement spot of the plurality of measurement spots by sending measurement radiation in a first measurement direction at a first rotational position of the rotationally supported scanner and to measure a second coordinate of a second measurement spot by sending measurement radiation in a second measurement direction at a second rotational position of the rotationally supported scanner;
   an inclinometer for measuring an inclination of the measurement coordinate system relative to the direction opposite to the direction of the force of gravity, wherein the inclinometer determines the direction of gravity used for the measurement; and a processing device for determining the angle of the first plane based on the measured coordinates of the plurality of measurement spots, the measured inclination from the inclinometer and the direction opposite to the force of gravity.

2. The measurement system according to claim 1, wherein the direction opposite to the force of gravity is used to form an axis of a reference coordinate system relative to the measurement coordinate system used by the inclinometer; and wherein the processing device is used:

for determining the coordinates of the plurality of measurement spots in the reference coordinate system based upon the measured inclination;

for estimating a specification of a line in the first plane based on the coordinates of the plurality of measurement spots in the reference coordinate system;

for projecting the line onto a plane perpendicular to the intersection in an object coordinate system, the object coordinate system comprising a Z-axis opposite to the direction of the force of gravity;

for determining an angle between the Z-axis and the projection of the line; and for determining the angle of the first plane of the object based on the determined angle and the direction opposite to the direction of the force of gravity.

3. The measurement system according to claim 1, further comprising;

a further fixed sensor arrangement, fixedly mounted to the folding machine on the framework in a relative location and orientation between the object and the measurement system by a mounting part on the opposite side of the plane of symmetry from the aforementioned fixed sensor arrangement, the further fixed sensor arrangement for measuring the coordinates in a further measurement coordinate system of a further plurality of measurement spots in the second surface area, the further plurality of measurement spots comprising a third measurement spot at a third distance from the intersection along the plane of symmetry and a fourth measurement spot at a fourth distance from the intersection along the plane of symmetry, the fourth distance differing from the third distance; and a further inclinometer for measuring a further inclination of the further measurement coordinate system to the direction opposite to the direction of the force of gravity;

the processing means being further arranged to determine the angle of the second plane based on the measured coordinates of the further measurement spots and the measured further inclination.

4. The measurement system according to claim 3, wherein the direction opposite to the force of gravity forms an axis of a further reference coordinate system used by the further inclinometer; and wherein the processing means is further used:

for determining the coordinates of the further plurality of measurement spots in the further reference coordinate system based on the measured further inclination;

for estimating a specification of a further line in the second plane based on the coordinates of the further plurality of measurement spots in the further reference coordinate system;

for projecting the further line onto a plane perpendicular to the intersection in an object coordinate system;

for determining a further angle between the projection of the further line and a Z-axis opposite to the direction of the force of gravity; and for determining the angle of the second plane of the object based on the determined angle and the determined further angle.

5. For an object having a first plane with a first surface area facing away from a plane of symmetry, said plane of symmetry being centrally arranged within a folding machine and is parallel to a drive section of a first element and a second element of said folding machine, said elements being arranged about said plane of symmetry and are driven to impart a force upon the object to form an expected fold around said plane of symmetry and an adjacent second plane with a second surface area facing away from the plane of symmetry with a non-zero angle formed between the first plane and the second plane along the plane of symmetry, a measurement system is for measuring at least an angle of the first plane, comprising:

a sensor arrangement comprising a fixed sensor, fixedly mounted to the folding machine on a framework in a relative location and orientation between the object and the measurement system by a mounting part, the fixed sensor for measuring the coordinates in a measurement coordinate system of a plurality of measurement spots on the first surface area, the plurality of measurement spots comprising a first measurement spot at a first distance from an intersection between the first plane and the second plane along the plane of symmetry and a second measurement spot at a second distance from the intersection, the second distance differing from the first distance;

and wherein the fixed sensor arrangement further comprises a rotationally supported scanner rotationally mounted inside of the fixed sensor to support several rotational positions of the scanner, the rotationally supported scanner being arranged to measure a coordinate of a first measurement spot of the plurality of measurement spots by sending measurement radiation in a first measurement direction at a first rotational position of the rotationally supported scanner and to measure a second coordinate of a second measurement spot by sending measurement radiation in a second measurement direction at a second rotational position of the rotationally supported scanner;

an inclinometer for measuring an inclination of the measurement coordinate system relative to the direction opposite to the direction of the force of gravity, wherein the inclinometer determines the direction of gravity used for the measurement;

a processing device for determining the angle of the first plane based on the measured coordinates of the plurality of measurement spots, the measured inclination from the inclinometer and the direction opposite to the force of gravity and a further fixed sensor arrangement, fixedly mounted to the folding machine on the framework in a relative location and orientation between the object and the measurement system on the opposite side of the plane of symmetry from the aforementioned fixed sensor arrangement by a mounting part, the further fixed sensor arrangement for measuring the coordinates in a further measurement coordinate system of a further plurality of measurement spots in the second surface area, the further plurality of measurement spots comprising a third measurement spot at a third distance from the intersection along the plane of symmetry and a fourth measurement spot at a fourth distance from the intersection along the plane of symmetry, the fourth distance differing from the third distance;
a further inclinometer for measuring a further inclination of the further measurement coordinate system to the direction opposite to the direction of the force of gravity; and the processing means being further arranged to determine the angle of the second plane based on the measured coordinates of the further measurement spots and the measured further inclination.

* * * * *